United States Patent
Kirchhoff

[11] 3,936,155
[45] Feb. 3, 1976

[54] THREE-ELEMENT PROJECTION LENSES

[75] Inventor: Kurt Kirchhoff, Hamburg-Lurup, Germany

[73] Assignee: Heinrich Reichmann, Hamburg-Lurup, Germany

[22] Filed: Jan. 9, 1974

[21] Appl. No.: 431,680

[30] Foreign Application Priority Data
Jan. 10, 1973 Germany............................ 2300985

[52] U.S. Cl. ................................................ 350/226
[51] Int. Cl.² ........................................... G02B 9/04
[58] Field of Search ...................................... 350/226

[56] References Cited
UNITED STATES PATENTS

| | | |
|---|---|---|
| 540,122 | 5/1895 | Taylor.................................. 350/226 |
| 1,937,168 | 11/1933 | Repp..................................... 350/226 |
| 3,408,135 | 10/1968 | Appeldorn et al.................. 350/226 |
| 3,773,404 | 11/1973 | Moore .................................. 350/226 |

*Primary Examiner*—Alfred E. Smith
*Assistant Examiner*—Conrad J. Clark
*Attorney, Agent, or Firm*—Beaman & Beaman

[57] ABSTRACT

A triplet-type three element lens comprises three lens elements made of substantially the same optical glass. The glass may be crown glass having an Abbé number greater than 50, a refractive index of less than 1.535 and a specific gravity of less than 2.7. The lens may be symmetrical comprising front and rear planoconvex lenses and a central biconcave lens.

2 Claims, 2 Drawing Figures

THREE-ELEMENT PROJECTION LENSES

FIELD OF THE INVENTION

This invention relates to a three-element projection lens of the triplet type, in particular for overhead projectors, with a convergent front lens, a divergent center lens and a convergent rear lens.

BACKGROUND OF THE INVENTION

In overhead projectors, and other similar large-format projection systems, lenses of considerable overall diameter are required. In order to keep expenditures within acceptable limits, simple lenses in the form of two meniscus elements are frequently used, with a mirror normally being provided between the two meniscus elements. The overall diameters of the meniscus elements can, for example, amount to 95 mm. The reproduction quality attainable using meniscus elements of this kind is, however, only of moderate order. Better overhead projectors, therefore, contain more expensive lenses, preferably three-element triplet-type anastigmatic systems, a deflecting mirror conveniently being arranged above the lens. Of course, the considerable extra costs incurred by the requisite lens sizes have to be accepted. These costs are due in particular to the quantity and quality of the optical glass needed.

It is an object of the invention to provide a projection lens which is highly suitable for overhead projectors and other similar applications, and which can be manufactured with comparatively little outlay and at low costs.

SUMMARY OF THE INVENTION

In accordance with the invention, a projection lens of the kind referred to above is characterised in that all three lens elements are made of substantially the same optical glass.

A lens in accordance with the invention is thus in clear contrast to the known triplet systems in which, throughout, the obvious principle is followed that, in view of the positive overall focal length and the positive individual focal lengths of the front and rear elements, the divergent central lens is made of a glass which has a substantially higher dispersion effect than the glasses used for manufacture of the front and rear elements, in order to be able to compensate for the dispersion factors of the latter. This fundamental principle has controlled all previous thinking as far as the triplet type of lens system is concerned.

It has been found, however, that in a projection lens in accordance with the invention, using three elements of the same glass, it is possible to achieve straight forward correction conditions which yield a very satisfactory reproduction quality in the projection of relatively large originals, considering the normally moderate enlargements usually then involved. This applies in particular to the sizes of originals employed in process or overhead projectors, in which, in addition, there is still a relatively small aperture, considered in relation to other projectors, for the passage of the light rays. The said correcting conditions are also permitted because in a triplet lens system, thanks to good spherical correction, (something which is not possible with meniscus-type lenses), the effects of the longitudinal chromatic aberration can be reduced and the transverse chromatic aberration compensated for by an appropriate correction, it being possible in particular to exclude transverse chromatic aberration by a symmetrical design of the objective, thereby achieving significant production advantages.

It should be appreciated that, in a lens in accordance with the invention, all the elements will preferably be made of crown glass, i.e. a glass having a low dispersion effect, because the local chromatic aberrations which are due to uncompensated residual dispersion, can then be rendered correspondingly small. Preferentially, the Abbé number of the glass will be in excess of 50.

A glass of relatively low refractive index is preferably used, in particular one having a refractive index less than 1.533. This measure is quite unusual in relation to the center element of three element lenses, because in the known triplets, flint glasses are used for the center lens, i.e. glasses of high dispersion effects in order to correct chromatic aberrations, these glasses invariably having subsstantially higher refractive indices. In a projection lens in accordance with the invention, however, the advantage of the low-price, low refractive index, relatively simple crown glasses can be exploited without reservation because, in contrast with conventional three-element systems in which the first and third lenses consist of crown glasses, while the center lens is made of a flint glass having a higher refractive index, the low refractive index of a like crown glass center element has a favourable influence upon the Petzval curvature.

Because of the low refractive index of the center lens, which is designed to have a negative focal length, even at low refractive powers or larger radii of curvature, adequate Petzval curvature values are obtained. This enables thinner lens elements to be made, i.e. the amount of material involved is less (this is a particularly important factor when relatively large lens element diameters are involved) and also allows relatively large radii of curvature to be used, so that economic processing of the lens elements is easier to achieve. By way of comparison, it might be mentioned that, in normal double meniscus lens systems, the Petzval sum is about 0.7 while in normal anastigmatic systems it is about 0.4, whereas in a lens in accordance with the invention it can be about 0.5. It will thus be seen that a lens in accordance with the invention, despite the considerably simpler structure which it possesses as compared with normal anastigmatic systems, enables a similar improvement in the flattening of the image field to be achieved when considered in relation to double meniscus lenses of similar, simple glasses. The inherent advantage of the triplet over the double meniscus system, i.e. of a shorter installed length, is of course also retained. Consequently, a triplet lens in accordance with the invention, can be built with relatively small lens element diameters. This reduces the material and other costs, not only in respect of the lens itself but also in respect of the diffracting mirror which can then be arranged outside the lens and still have an acceptable size, so that it can be pivoted in the normal way without interfering with the beam of light passing through the lens. In a double meniscus lens system, in which the mirror is normally arranged between the two lens elements, on the other hand, any pivoting on the part of the mirror is accompanied by attendant impairment because the optical axis then migrates a considerable way from the axis of the front lens.

In order to achieve the desired reduction in the amount of material used, it is advantageous, furthermore, if all the lens elements are made of a glass of relatively low density, in particular a density of less than 2.7 g/cm³. It will be appreciated from the foregoing statements that a simple and relatively inexpensive optical crown glass will be suitable for a projection lens in accordance with the invention, i.e. a glass of the kind used on a large scale by many manufacturers for simple optical equipment. A typical representative of a mass-produced glass of this kind is the crude spectacle glass manufactured by numerous glass makers, with a refractive index of $n_d = 1.52249$ and an Abbé number of $v = 59.6$. This glass is sold, for example, under the trade name K5 by the firm Jenaer Glaswerks Schott & Gen. A further advantage resides in the fact that this glass, and indeed any other ordinary crown glass, generally has favourable optical properties of application. For example it has a relatively low specific gravity, has good optical transparency, has high chemical resistance and is extremely scratch and wipe-resistant.

During the manufacture of a projection lens in accordance with the invention it is possible to introduce further simplifications without appreciably impairing the optical quality of the lens. In particular, the front and rear lens elements may be identical planaoconvex elements. In the manufacture of the lens elements this simplifies their storage as well as assembly of the lens. The center lens element can, in particular, if inherently symmetrical in design, be a biconcave lens with two identical radii of curvature. This, too, is clearly of advantage from the production point of view.

The cost of a set of unground pressings from a factory, in the case of projection lenses in accordance with the invention, is only a fraction of the cost of comparable conventional triplet-type anastigmatic projection lenses.

DESCRIPTION OF THE PREFERRED EMBODIMENTS

Figure 1:
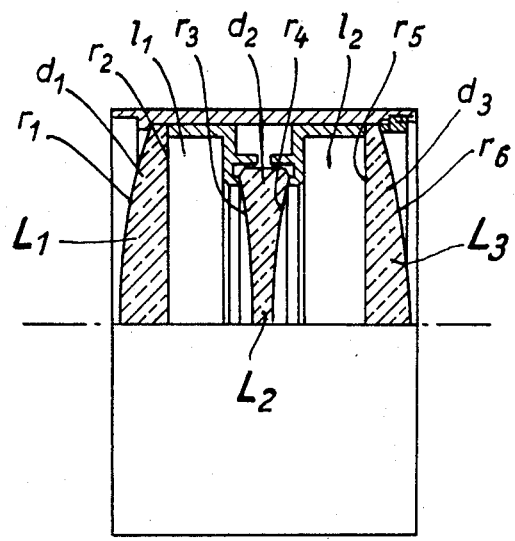
FIG. 1 is a schematic illustration of a first embodiment of projection lens.

The lens shown in FIG. 1 is symmetrical vis-a-vis the center element $L_2$ and has the further advantage from the production point of view that the front element $L_1$ and the rear element $L_3$ are identical planoconvex lenses, and that the center element $L_2$ is a biconcave lens with two identical radii of curvature. The parameters of the lens are, considered in relation to an image-side focal length of $f' = 100$, as follows:

Image intercept length $s' = 92.69$
Image angle $2\sigma = 43°$
Petzval sum $\Sigma P = 0.524$

| Lens | element/Radii | Thicknesses | Refractive Index $n_d$ | Dispersion $v_d$ | Diameter |
|---|---|---|---|---|---|
| $L_1$ | $r_1 = +28.132$ | | | | |
| | | $d_1 = 2.49$ | 1.52249 | 59.48 | 19.4 |
| | $r_2 =$ plane | | | | |
| | | $P_1 = 4.52$ | | | |
| $L_2$ | $r_3 = -35.827$ | | | | |
| | | $d_2 = 0.87$ | 1.52249 | 59.48 | 15.3 |
| | $r_4 = +35.827$ | | | | |
| | | $P_2 = 4.52$ | | | |
| $L_3$ | $r_5 =$ plane | | | | |
| | | $d_3 = 2.49$ | 1.52249 | 59.48 | 19.4 |
| | $r_6 = -28.132$ | | | | |

Figure 2:
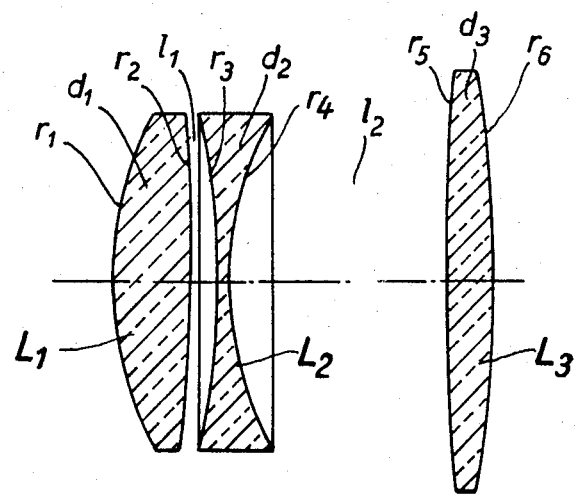
FIG. 2 is a schematic illustration of a second embodiment.

FIG. 2 illustrates an asymmetric embodiment, with the following parameters again related to a focal length of $f' = 100$:

Intercept length $s' = 86.06$
Image angle $2\sigma = 48°$
Petzval sum $\Sigma P = 0.401$

| Lens | element/Radii | Thicknesses | Refractive Index $n_d$ | Dispersion | Diameter |
|---|---|---|---|---|---|
| $L_1$ | $r_1 = +16.344$ | | | | |
| | | $d_1 = 3.95$ | 1.52249 | 59.48 | 16.5 |
| | $r_2 = -82.598$ | | | | |
| | | $l_1 = 1.27$ | | | |
| $L_2$ | $r_3 = -43.484$ | | | | |
| | | $d_2 = 0.51$ | 1.52249 | 59.48 | 16.5 |
| | $r_4 = +16.180$ | | | | |
| | | $l_2 = 11.04$ | | | |
| $L_3$ | $r_5 = +137.117$ | | | | |
| | | $d_3 = 2.36$ | 1.52249 | 59.48 | 20.6 |
| | $r_6 = -62.876$ | | | | |

The two examples described show that within the context of the invention lenses of widely differing form are possible so that there is a correspondingly wide scope for the creation of other embodiments.

What is claimed is:

1. A triplet-type three-element projection lens particularly suitable for overhead projectors projecting non-monochromatic light, comprising, in combination, a convergent front lens element, a divergent center lens element and a convergent rear lens element in aligned relationship defining a light path, said lens elements being formed of substantially the same optical glass having a refractive index of less than 1.535, said lens having the following design parameters, related to a focal length of $f' = 100$:

Image intercept length $s' = 92.69$
Image angle $2\sigma = 43°$
Petzval $\Sigma P = 0.524$

| Lens | element/Radii | Thicknesses | Refractive Index $n_d$ | Dispersion $v_d$ | Diameter |
|---|---|---|---|---|---|
| $L_1$ | $r_1 = +28.132$ | $d_1 = 2.49$ | 1.52249 | 59.48 | 19.4 |
| | $r_2 =$ plane | | | | |
| | | $p_1 = 4.52$ | | | |
| $L_2$ | $r_3 = -35.827$ | $d_2 = 0.87$ | 1.52249 | 59.48 | 15.3 |
| | $r_4 = +35.827$ | | | | |
| | | $p_2 = 4.52$ | | | |
| $L_3$ | $r_5 =$ plane | $d_3 = 2.49$ | 1.52249 | 59.48 | 19.4 |
| | $r_6 = -28.132$ | | | | |

2. A triplet-type three-element projection lens particularly suitable for overhead projectors projecting non-monochromatic light, comprising, in combination, a convergent front lens element, a divergent center lens element and a convergent rear lens element in aligned relationship defining a light path, said lens elements being formed of substantially the same optical glass having a refractive index of less than 1.535, said lens having the following design parameters, considered in relation to a focal length of $f' = 100$:

Image intercept length $s' = 86.06$
Image angle $2\sigma = 48°$
Petzval sum $\Sigma P = 0.401$

| Lens | element/Radii | Thicknesses | Refractive Index $n_d$ | Dispersion $v_d$ | Diameter |
|---|---|---|---|---|---|
| $L_1$ | $r_1 = +16.344$ | $d_1 = 3.95$ | 1.52249 | 59.48 | 16.5 |
| | $r_2 = -82.598$ | | | | |
| | | $p_1 = 1.27$ | | | |
| $L_2$ | $r_3 = -43.484$ | $d_2 = 0.51$ | 1.52249 | 59.48 | 16.5 |
| | $r_4 = +16.180$ | | | | |
| | | $p_2 = 11.04$ | | | |
| $L_3$ | $r_5 = +137.117$ | $d_3 = 2.36$ | 1.52249 | 59.48 | 20.6 |
| | $r_6 = -62.876$ | | | | |

\* \* \* \* \*